U.S. Patent Number: 4,671,659
Date of Patent: Jun. 9, 1987

Rempt et al.

[54] FIBER OPTIC DISPLACEMENT SENSOR

[75] Inventors: Raymond D. Rempt, Woodinville, Wash.; Ludwig G. Wolfert, Littleton, Colo.

[73] Assignee: Martin Marietta Corporation, Bethesda, Md.

[21] Appl. No.: 796,282

[22] Filed: Nov. 8, 1985

[51] Int. Cl.⁴ ................................. G01B 9/02
[52] U.S. Cl. ................................. 356/358; 73/800; 250/227; 356/345
[58] Field of Search ............ 356/35.5, 345, 358; 250/227; 350/96.26; 73/800

[56] References Cited

U.S. PATENT DOCUMENTS

| 4,163,397 | 8/1979 | Harmer | 356/32 X |
| 4,191,470 | 3/1980 | Butter | 356/35.5 |
| 4,486,657 | 12/1984 | Bush | 250/227 |
| 4,609,871 | 9/1986 | Bobb | 250/227 X |

FOREIGN PATENT DOCUMENTS

85/01802 4/1985 PCT Int'l Appl. ............ 350/96.29

Primary Examiner—Davis L. Willis
Assistant Examiner—Matthew W. Koren
Attorney, Agent, or Firm—Tarolli, Sundheim & Covell

[57] ABSTRACT

An optical displacement sensor serves to sense variations in the displacement of a test article. This is achieved by securing a portion of the length of an optical fiber between two spaced points on a test article and then supplying a laser beam to propagate through the measurement fiber as well as through a reference fiber of the same length. Expansions and contractions of the test article causes changes in length of the measurement fiber. The light beams are recoupled to produce an interference pattern which varies as a function of variations in displacement of the test article.

7 Claims, 4 Drawing Figures

FIBER OPTIC DISPLACEMENT SENSOR

BACKGROUND OF THE INVENTION

This invention relates to the art of displacement sensors and, more particularly, to an interferometric displacement sensor employing fiber optics for detecting displacement changes of a test article.

The invention is particularly applicable for use in conjunction with determining displacement changes of a test article subjected to displacement due to thermal expansion, such as during thermal vacuum testing of space vehicle components where knowledge of thermally induced distortion is required and the like.

The prior art has employed fiber optic technology for use in strain gauges. One example of such prior art is found in A. Harmer U.S. Pat. No. 4,163,397. This patent discribes a structure for measuring strain in a solid object employing an elongated optical fiber having a curved form which is attached to the solid object in such a way that the stresses are translated into changes of the curve form. This, in turn, creates changes in the propagation of light passing through the optical fiber. Harmer's apparatus, then, depends on changing the bend in the optical fiber to thereby create changes in the modal propagation of light therethrough. Contrary to the invention described therein, Harmer does not propose that the fiber be stretched as the object under test is lengthened, or that the dimensional change be measured, as with an interferometric device. Moreover, Harmer's apparatus serves as a strain guage, as opposed to the displacement sensor of the present invention.

Another teaching in the prior art relative to optical strain gauges takes the form of C. Butter U.S. Pat. No. 4,191,470. Butter discloses a laser-fiber optic interferometric strain gauge. The apparatus directs laser light into two single mode fibers, which are, in turn, each attached to a supporting member, the strain of which is to be measured. The far ends of the fibers are brought into close proximity and the light exiting from the two fibers interferes. As the supporting member undergoes a bending movement, it is strained and the interference fringes move providing a measure of the strain. It is to be noted, however, that Butter secures both of the fibers to the supporting member and the measure obtained is the difference of the length changes of the two fibers and not that of the supporting member itself.

BRIEF SUMMARY OF THE INVENTION

It is an object of the present invention to provide an interferometric displacement sensor employing fiber optics which measures the actual displacement, such as actual change in length, of a test member and not merely a relative change in length or a measure of strain.

It is a still further object of the present invention to provide such an apparatus that measures both the magnitude and the direction of the change in displacement of the test article.

It is a still further object of the present invention to provide such a displacement sensor adapted for use in measuring displacement, such as length change, due to thermal expansion or contraction of a test member.

It is a still further object of the present invention to employ such a sensor in conjunction with thermal vacuum testing of space vehicles where knowledge of thermally induced distortions is desired.

In accordance with the present invention, an optical displacement sensor is provided for sensing displacement of a test article. The sensor employs first and second single mode optical fibers. The first fiber is fastened at two spaced apart points along its length to a test article so as to define a fiber section under tension therebetween. Any variations in the length of the test article are reflected in variations in length of the fiber section under tension. The second fiber is free of any fastening to the test article. A coherent light source, such as a laser, is positioned adjacent a first end of each of the optical fibers for transmitting light thereto and which propagates through the two fibers. The light in the fibers is recombined in a coupler to produce an optical interference pattern. This pattern varies as a function of any variations in the length of the fiber section under tension and, hence, any variation in the length of the test article.

In accordance with another aspect of the present invention, the optical displacement sensor, but for the coherent light source means, is located within a thermal vacuum chamber such that the first and second fibers undergo essentially the same thermal conditions during the measurement operation.

In accordance with a still further aspect of the present invention, the direction of the displacement is determined, in part, by modulating the light which flows through the second fiber.

BRIEF DESCRIPTION OF THE DRAWINGS

The foregoing and other objects and advantages of the present invention will become more readily apparent from a consideration of the following description as taken in conjunction with the accompanying drawings, wherein.

DETAILED DESCRIPTION OF PREFERRED EMBODIMENT

The optical displacement sensor presented herein serves to sense variations in displacement of a test article. This displacement may be along a straight line, for measuring displacement in length of a test article, a curved line for measuring changes in circumference of a test article, or some arbitrary path. In any event, the sensor itself employs first and second single mode optical fibers. A first fiber, sometimes referred to herein as the measurement fiber, is fastened to two points on a test article. The length of fiber between the two points is held taut, or in tension, during the measurement process. The path between the two points may be a straight line, a curved line or arbitrary. As the two points on the test article become displaced, a corresponding displacement takes place along the taut length of the measurement fiber. The second measurement fiber is of the same length as the first fiber. Each fiber has an input end positioned adjacent a source of coherent light, such as a laser, and light from the laser propagates through each of the fibers. The fibers are coupled so that an interference effect is observed. Elongation or contraction of the taut portion of the measurement fiber results in changes in the optical path length through the measurement fiber, which causes interference fringes when the light exiting from the two fibers is recoupled. As will be brought out hereinafter, the fringes are counted by a detector and expressed as a net length change. This, then, provides a measure of displacement between the two points on the test article.

Figure 1:
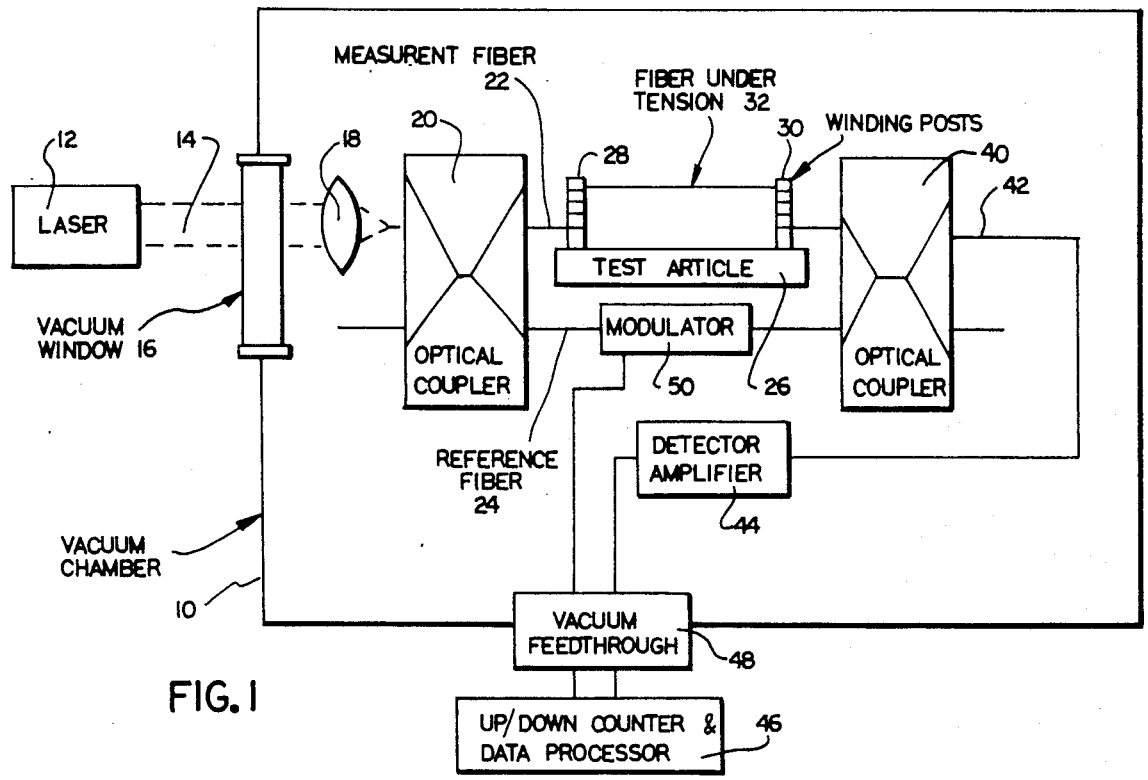
FIG. 1 is a schematic-block diagram of one embodiment of the invention.

Reference is now made to one embodiment of the invention as illustrated in FIG. 1. As illustrated, the detector is located in a suitable vacuum chamber 10. The laser source 12 is located on the exterior of chamber 10 and serves to direct a laser beam 14 into the chamber by way of a window 16 located in a side wall of the chamber 10. The laser beam is focused by a lens 18 and is directed to a fiber optic coupler 20. The optical fiber coupler 20 divides the laser light beam and supplies it to a measurement optical fiber 22 and a reference optical fiber 24. These two optical are of the form known as single mode optical fibers. The measurement fiber 22 is fastened along its length to two points on a test article 26, the displacement of which is to be measured. The test article 26 is provided with two upstanding posts 28 and 30 suitable fixed to the test article. The measurement fiber 22 is suitably secured to the two posts by wrapping a portion of the length of the fiber about each post so that over a measurement length 32 between the two posts, the optical fiber 22 is taut or in tension. The free end of the optical fiber is then suitably coupled to the reference fiber 24.

The reference fiber 24 extends between the optical couplers 20 and 40 and is preferably of a length corresponding with that of the measurement fiber 22, in terms of its length between the two couplers.

The beam from the laser source 12, which, for example, may take the form of a helium neon gas laser, is split by the optical coupler 20 and directed to the two optical fibers 22 and 24 and the light is then recombined at the optical coupler 40. This light will interfere, producing interference fringes. If the length of one fiber changes with respect to the other, the relative phase of the light in the two optical fibers will change. This change in relative phase will change the angular position of the interference fringes produced. This is a measure of the relative change in the length of the two fibers. The optical coupler 40 recombines the two light beams, producing the interference signal, and this is then passed by an optical path, such as another optical fiber 42 to a detector amplifier 44 which converts the optical signal into an electrical signal which is an oscillating signal having a magnitude and frequency depending upon the standing wave pattern or fringe pattern at the output of the coupler. The zero crossings of this signal are gated and counted by an up/down counter located in a data processor 46 yielding the net displacement change of the portion of the measurement fiber under tension, i.e., length portion 32.

The reference fiber 24 is preferably modulated in length by means of a modulator 50 to provide a standing wave when the two fibers are recombined. This allows the direction of the length change of fiber 22 to be determined also. The modulator, as will be described in greater detail hereinafter with reference to FIG. 2, may take the form of a piezoelectric cylinder around which a few turns of the reference fiber are wound. A low frequency voltage is then applied by an electrical connection through the vacuum feedthrough 48. This voltage is preferably applied radially in a manner to cause the piezoelectric cylinder to alternately expand and contract at a known frequency. This causes the reference fiber to contract and expand in its length at a frequency which tracks the applied signal voltage. This, then, affects the phase of the light passing through the reference fiber which, when coupled with that from the measurement fiber 22, produces a standing wave pattern at the output of coupler 40. Any change in the measurement fiber, then, causes a shift in the pattern to the left or right, depending on the direction of change.

Figure 2:
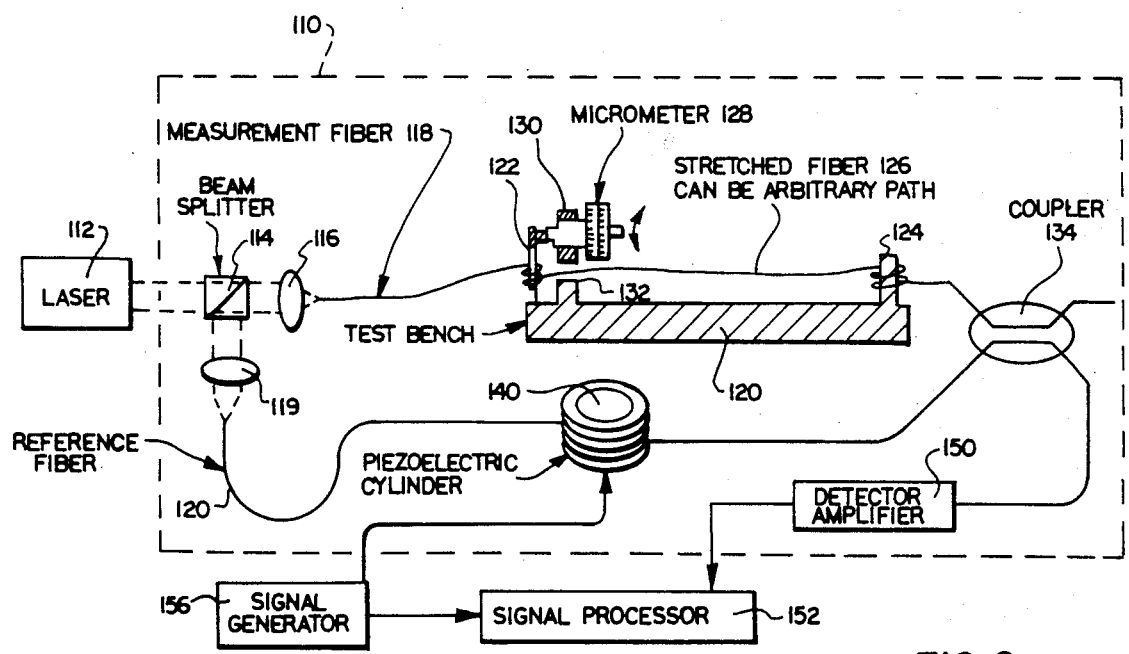
FIG. 2 is a schematic-block diagram of a second embodiment of the invention.

Reference is now made to FIG. 2 which illustrates another embodiment of the invention. In this embodiment, the environmental enclosure or vacuum chamber is illustrated by the dotted line 110. A laser source 112, corresponding with laser source 12 in FIG. 1, supplies a laser beam as by way of a vacuum window (not shown) in the wall of the enclosure. The laser beam is then split by a beam splitter 114. This beam splitter divides the laser beam and directs it along two paths, one being by way of a lens 116 which focuses the beam into a measurement fiber 118 corresponding with measurement fiber 22 in FIG. 1. The other path directs the beam to a lens 119 which focus the beam into a reference fiber 120 which corresponds with the reference fiber 24 in FIG. 1. The measurement fiber 118 is fixed at two points along its length to a test bench 120. At one point, the test bench 120 has a beam 122 extending vertically upward therefrom and the measurement fiber is wrapped a few turns around the beam. At the other end of the test bench, the optical fiber 118 is wrapped about an upstanding post 124 extending upwardly from the test article 120. The intermediate length 126 of the fiber is maintained taut or in tension. For test purposes, a micrometer 128 is suitably mounted to an upstanding post 130 so that the micrometer may be adjusted to cause deflection of beam 122 so as to cause expansion or contraction of fiber portion 126. The post 130 may have a suitable aperture 132 permitting the fiber 118 to extend therethrough between beam 122 and post 124. The exiting end of the optical fiber is applied to an optical coupler 134.

The reference fiber 120 is of the same length between the beam splitter 114 and the coupler 134 as the measurement fiber 118. A portion of the length of the reference fiber 120 has a few turns wrapped about a piezoelectric cylinder 140 and then extends to the coupler 134. The coupler 134 serves to recombine the light beams in the two fibers, producing interference, and this optical signal is then supplied through one of the output arms of the coupler to a detector amplifier 150 which converts the optical signal into an electrical signal which is then supplied to a signal processor 152 as by way of a suitable vacuum feedthrough (not shown). A signal generator 156 is electrically connected to the piezoelectric cylinder by an electrical connection supplied through the vacuum feedthrough for purposes of supplying a low frequency voltage to the piezoelectric cylinder for modulating the length of the reference fiber. Thus, the alternating voltage which is applied radially to the piezoelectric cylinder causes it to alternately expand and contract, and this lengths and shortens the reference fiber. The modulated light in the reference fiber is combined with the light in the measurement fiber at the coupler 134. A standing wave interference pattern is detected at the detector amplifier. A change in the length of the measurement fiber will cause a shift to the left or right in the interference pattern, depending upon the sign of the length change. Each wave of the interference pattern corresponds to one wavelength of the helium neon (HeNe) laser light in the fiber core. For a quartz core this corresponds to 0.43 microns.

Figure 3A:
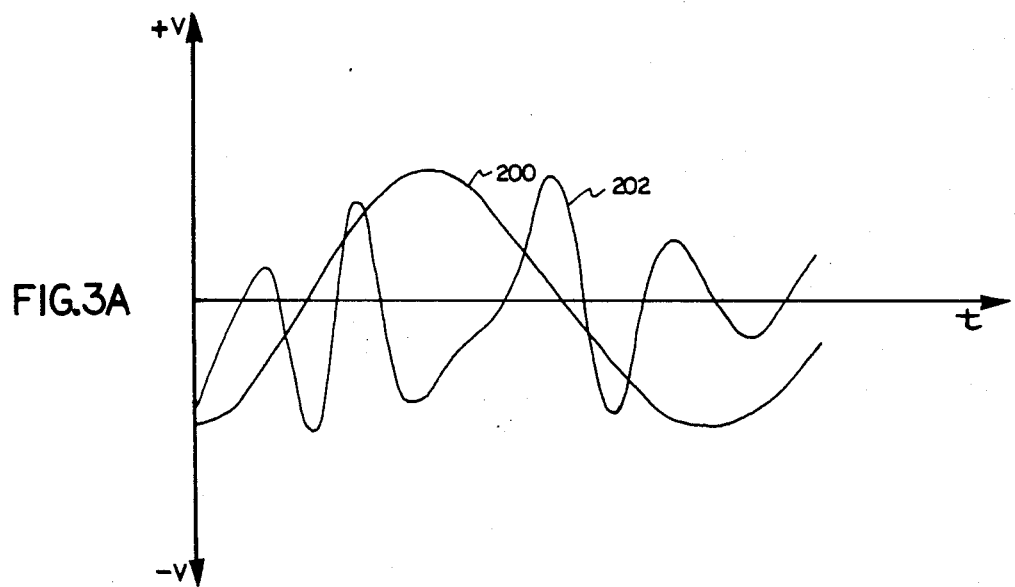
FIG. 3, which is comprised of FIGS. 3A and 3B, are waveforms illustrating the operation of the invention.
Figure 3B:
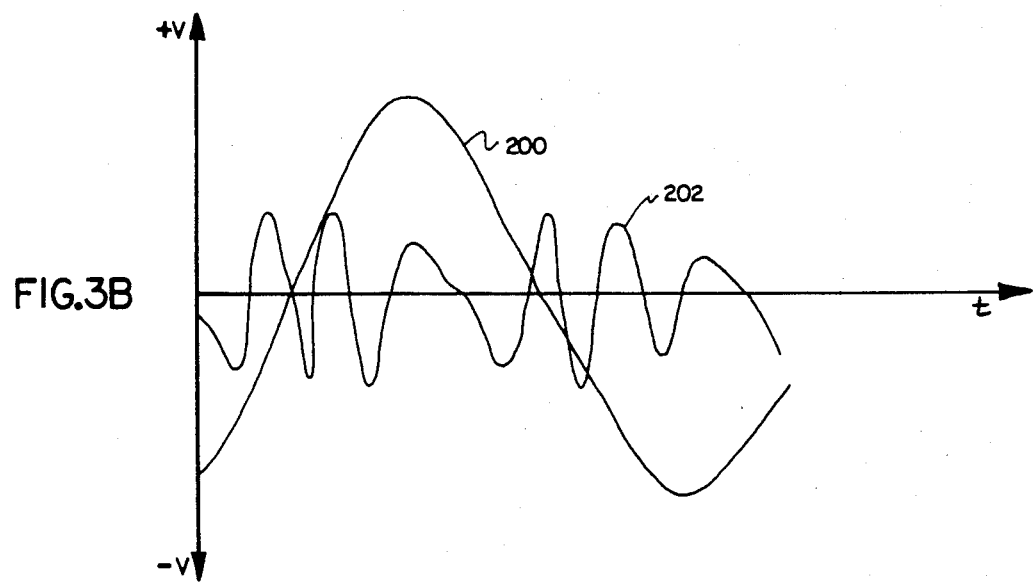

The piezoelectric cylinder 140 may be excited by a drive voltage obtained from the signal generator 156 from a few hertz to several hundred kilohertz. The interference pattern frequency detected at the coupler output is dependent upon both the frequency and amplitude of the modulation drive voltage. This allows the interference signal frequency to be adjusted for minimum noise without changing the modulation frequency. Because the total phase change caused by the applied drive voltage is proportional to its amplitude, the resulting interference signal frequency also depends on the amplitude of the drive voltage. This is illustrated by the waveforms in FIGS. 3A and 3B. In FIG. 3A, the drive voltage 200 is illustrated as being a sinusoidal signal and, for example, may have an amplitude of 25 volts peak-to-peak at 20 Hz. The resulting interference signal 202 is shown as being superimposed. In FIG. 3B, the drive voltage 200 has been increased to, for example, 35 volts peak-to-peak, still at a frequency on the order of 20 Hz. However, the resulting interference signal 202, as seen by the detector amplifier, is several times the frequency of that in FIG. 3A. Thus, it is seen that the resulting interference signal frequency varies with the amplitude of the drive voltage. This allows selection of a suitable detection frequency once the drive frequency is fixed, allowing optimum adjustment for fast changes of measured elongation and noise elimination.

The coupler 134 and the modulator or piezoelectric cylinder 140 could be eliminated to generate and observe an optical interference pattern, however, the electronic signal processing method described below has many advantages.

When the reference fiber 120 elongates because the piezoelectric cylinder 140 expands, an elongating measurement fiber 126 causes a decrease of the interference signal frequency. Inversely, this frequency increases if the measurement fiber decreases during expansion of the piezoelectric cylinder. This phenomenon can be used to determine direction and magnitude of the measurement fiber elongation. When the measurement fiber does not change, the frequency of the interference signal is determined by the rate of reference fiber elongation which is proportional to the frequency and amplitude of the piezoelectric cylinder's oscillations. A beat frequency signal $f_1$ is generated by electronic sampling of interference signal at the same frequency as the excitation frequency of the piezoelectric cylinder and at a fixed phase shift relative to the zero crossings of the excitation frequency. This beat frequency $f_1$ has zero crossings only for every increment of measurement fiber elongation. These increments are smaller than one-half wavelength of the coherent light in vacuum and depend also on the optical fiber's index of refraction and its elasto-optic effect.

To determine the direction of the measurement fiber, a second signal $f_2$ is generated by sampling relative to sampling for signal $f_1$ at a phase shift of 90 degrees of the interference frequency caused by the piezoelectric cylinder. The frequencies of signals $f_1$ and $f_2$ will be the same and will have a 90 degree phase shift for constant rates of elongation. The polarity of this phase shift is a measure to determine if the fiber is elongating or contracting. From the analog signals $f_1$ and $f_2$, elongation can be determined with a resolution much smaller than half a wavelength of light. Digital elongation measurements with resolution of approximately half a wavelength of the coherent light can be performed with an up-down counter by sensing the polarity of signal $f_2$ during rising and during falling zero transitions of signal $f_1$. The zero transitions of signal $f_1$ trigger the counts and the up or down counting is determined by sensing at the zero transition of signal $f_1$, the polarity of signal $f_2$ and by sensing if the zero transition of signal $f_1$ is caused by a trailing or leading edge signal. For example, each count of the up-down counter may correspond to a measurement change of 0.28 micrometers. The optical interference signal detected by the electro-optical preamplifier is preferably amplified by a logarithmic amplifier or an amplifier with automatic gain control.

The sensor, as demonstrated in FIG. 2, has been tested against a precision micrometer, such as micrometer 128 in FIG. 2. Various extensions and contractions of the measurement fiber have been achieved. Ten contractions from 50 to 100 micrometers in magnitude were done with a resulting sensitivity of 0.99 counts per micron. The results are repeatable, both in magnitude and in directional repeatability. The tests were run with an electronic counter set to count only every full wave of phase change.

Whereas the invention has been described in conjunction with preferred embodiments, it is to be appreciated that various changes and modifications may be made without departing from the spirit and scope of the invention as defined by the appended claims.

Having described specific preferred embodiments of the invention, the following is claimed:

1. An optical displacement sensor for sensing variations in displacement of a test article, comprising:
   first and second single mode optical fibers;
   said first fiber being fastened at two spaced apart points along its length to two spaced points on a said test article so as to define a length section of said first fiber which is under tension between said two spaced points for sensing any variations in the displacement of said test article, said second fiber being free from experiencing dimensional changes of said test article;
   coherent light source means for supplying light into a first end of each of said optical fibers so that the light propagates through the two fibers towards a second end of each fiber; and,
   means for recoupling the light propagated through said fibers to produce a combined light beam having an optical interference pattern or interference effect which varies as a function of variations in the displacement of said test article.

2. An optical displacement sensor as set forth in claim 1 including first optical coupling means for receiving a laser beam and then supplying light beams therefrom to each of said first and second fibers for propagation therethrough.

3. An optical displacement sensor as set forth in claim 2 including second optical coupling means for optically coupling the light beams together to produce said optical interference data.

4. An optical displacement sensor as set forth in claim 3 wherein said first fiber and said second fiber are of equal length between said first and second optical coupling means.

5. An apparatus as set forth in claim 1 including means for modulating the length of said second optical fiber so as to thereby modulate the light beam propagating therethrough so that an optical interference signal is produced having a standing wave interference signal and which shifts in direction of frequency change in dependence upon the direction of a change in length between said two spaced apart points along the length of said first fiber.

6. An optical displacement sensor as set forth in claim 5 wherein said modulating means includes a piezoelectric cylinder and means for supplying a radially alternating voltage to said piezoelectric cylinder so that it periodically expands and contracts, said second fiber being wrapped about said piezoelectric cylinder so that as said cylinder expands and contracts, the portion of said second fiber wound around the piezoelectric cylinder lengthens and shortens.

7. An optical displacement sensor as set forth in claim 6 including detector amplifier means responsive to the optical interference pattern for providing an electrical output signal which varies in accordance therewith.

* * * * *